United States Patent
Kaiba et al.

(10) Patent No.: US 11,148,364 B2
(45) Date of Patent: Oct. 19, 2021

(54) THREE DIMENSIONAL MODELING APPARATUS

(71) Applicants: Tadashi Kaiba, Tokyo (JP); Shuusei Murai, Tokyo (JP)

(72) Inventors: Tadashi Kaiba, Tokyo (JP); Shuusei Murai, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/514,219

(22) Filed: Jul. 17, 2019

(65) Prior Publication Data
US 2020/0023580 A1      Jan. 23, 2020

(30) Foreign Application Priority Data

Jul. 19, 2018  (JP) .............................. JP2018-135802
Jun. 7, 2019   (JP) .............................. JP2019-107164

(51) Int. Cl.
*B29C 64/209*   (2017.01)
*B29C 64/112*   (2017.01)
*B29C 64/20*    (2017.01)
*B33Y 30/00*    (2015.01)

(52) U.S. Cl.
CPC ............ *B29C 64/20* (2017.08); *B29C 64/112* (2017.08); *B29C 64/209* (2017.08); *B33Y 30/00* (2014.12)

(58) Field of Classification Search
CPC ..... B29C 64/20; B29C 64/209; B29C 64/112; B33Y 30/00
See application file for complete search history.

(56) References Cited

U.S. PATENT DOCUMENTS

| | | | | |
|---|---|---|---|---|
| 5,059,266 A | * | 10/1991 | Yamane | B29C 41/08 118/313 |
| 2009/0167818 A1 | * | 7/2009 | Morita | B41J 2/1429 347/47 |
| 2011/0011992 A1 | * | 1/2011 | Cheng | B33Y 30/00 248/201 |
| 2013/0189435 A1 | | 7/2013 | Mackie et al. | |

(Continued)

FOREIGN PATENT DOCUMENTS

| | | |
|---|---|---|
| EP | 2829386 | 1/2015 |
| JP | 2004-330702 | 11/2004 |

(Continued)

OTHER PUBLICATIONS

Extended European Search Report for 19186983.3 dated Dec. 12, 2019.

*Primary Examiner* — Joseph S Del Sole
*Assistant Examiner* — Jerzi H Moreno Hernandez
(74) *Attorney, Agent, or Firm* — IPUSA, PLLC

(57) ABSTRACT

A three dimensional modeling apparatus is provided that includes an inkjet nozzle for discharging a molding material; a plurality of recording heads each having the inkjet nozzle; and a curing section for curing the molding material. Each of the plurality of recording heads includes a first recording head that discharges the molding material downward, and at least one of a second recording head that discharges the modeling material in a horizontal direction or a third recording head that discharges the modeling material upward. The inkjet nozzle opens and closes a discharging port with a valve body to discharge the molding material.

7 Claims, 11 Drawing Sheets

(56) References Cited

U.S. PATENT DOCUMENTS

| | | | |
|---|---|---|---|
| 2013/0293607 A1* | 11/2013 | Kaiba | B05B 13/0228 |
| | | | 347/9 |
| 2014/0197576 A1* | 7/2014 | Kraibuhler | B29C 64/112 |
| | | | 264/308 |
| 2016/0031156 A1* | 2/2016 | Harkness | B29C 64/10 |
| | | | 264/427 |
| 2016/0159006 A1 | 9/2016 | Wang et al. | |
| 2017/0227026 A1* | 8/2017 | Chaudhary | F16K 31/007 |
| 2018/0036939 A1* | 2/2018 | Sundaresan | B33Y 70/00 |

FOREIGN PATENT DOCUMENTS

| | | | |
|---|---|---|---|
| JP | 2008008356 A | * | 1/2008 |
| JP | 2018-004682 | | 1/2018 |

\* cited by examiner

THREE DIMENSIONAL MODELING APPARATUS

CROSS-REFERENCE TO RELATED APPLICATION

The present application claims priority under 35 U.S.C. § 119 to Japanese Patent Application No. 2018-135802 filed on Jul. 19, 2018 and No. 2019-107164 filed on Jun. 7, 2019, the entire contents of which are incorporated herein by reference.

BACKGROUND OF THE INVENTION

Field of the Invention

The present invention relates to a three dimensional modeling apparatus.

Description of the Related Art

A three dimensional modeling apparatus is known to form a solid object, and the three dimensional modeling apparatus is classified into one of the following three types of shaping methods.

(1) Heat-melting lamination method: a method in which a recording head similar to a dispenser laminate a modeling material by extruding the modeling material being melted so as to form a solid object.

(2) Powder lamination method: a method in which necessary portions of a powder layer of a material for forming are cured by some means and laminated so as to form a solid object.

(3) Material inkjet method: a method in which a material for forming is discharged from a recording head, cured by some means, and laminated to form a solid object.

Conventional material inkjet type three dimensional modeling apparatuses are such that a recording head discharging a modeling material, for example, a UV (Ultra Violet) curable resin, is positioned above a platform on which a solid object is mounted, discharges UV curable dots from the recording head downward, and irradiates the UV curable resin on the discharged platform with ultraviolet light (UV) to cure the UV curable resin.

Then, the next UV curable resin is further discharged onto the hardened UV curable resin and the solid objects are formed by repeating as many layers as necessary in a process of sequential curing. Meanwhile, for example, Patent Document 1 may be referred to as a method and a three dimensional modeling apparatus includes for forming a solid object.

[Patent Document 1] Japanese Unexamined Patent Application Publication No. 2004-330702

SUMMARY OF THE INVENTION

According to one aspect of the present invention, an image processing system is provided that includes an inkjet nozzle for discharging, a modeling material; a plurality of recording heads each having the inkjet nozzle; and a curing section for curing the modeling material, wherein each of the plurality of recording heads includes a first recording head that discharges the modeling material downward, and at least one of a second recording head that discharges the modeling material in a horizontal direction or a third recording head that discharges the modeling material upward, wherein each of the inkjet nozzle opens and closes a discharging port with a valve body to discharge the modeling material.

According to another aspect of the present invention, the second recording head and the third recording head may move relative to a periphery of the solid object by allowing a platform, on which the solid object is placed, to rotate horizontally.

DESCRIPTION OF THE EMBODIMENTS

Hereinafter, a three dimensional modeling apparatus according to the present invention will be described in detail with reference to the drawings and in accordance with one preferred embodiment. First, a first embodiment will be illustrated.

1. First Embodiment

Configuration of First Embodiment of Three Dimensional Modeling Apparatus

Figure 1:
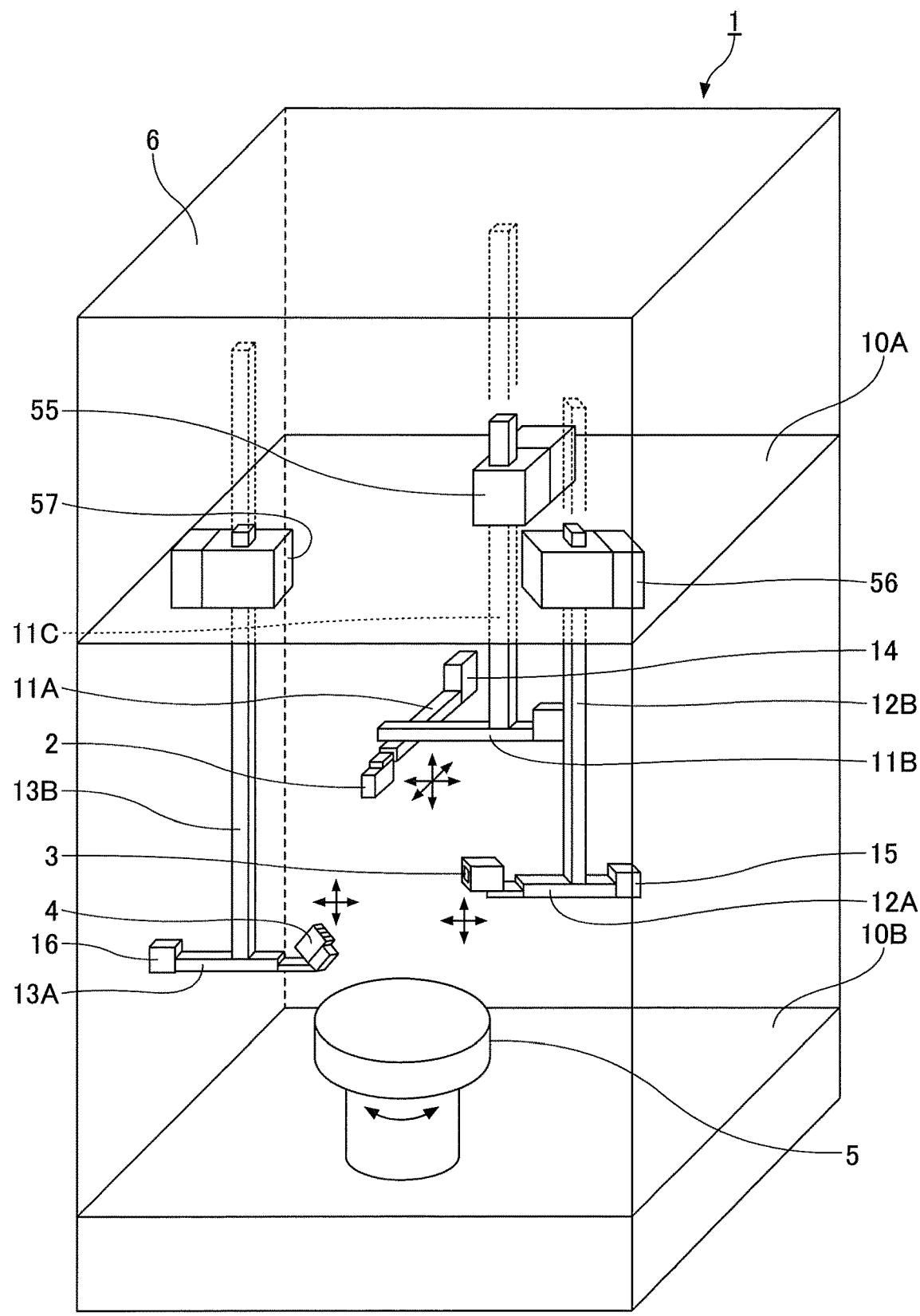
FIG. 1 is a perspective view illustrating a configuration of a main portion of a three dimensional modeling apparatus according to a first embodiment.

FIG. 1 is a perspective view illustrating a configuration of a main portion of a three dimensional modeling apparatus according to a first embodiment. The illustrated three dimensional modeling apparatus 1 includes a first recording head 2, a second recording head 3, a third recording head 4, a platform 5, and a housing 6, a first drive mechanism 55, a second drive mechanism 56, and third drive mechanism 57.

The first recording head 2 mounts a plurality of valve-type inkjet nozzles and is movable in a horizontal direction and a vertical direction in a stage of being arranged so as to discharge a modeling material such as a UV curable resin from a top to a bottom. The second recording head 3 mounts a plurality of valve type inkjet nozzles, is movable in the horizontal direction and the vertical direction in a stage of being arranged so as to discharge the modeling material in the horizontal direction (lateral direction), and is relatively movable around the solid object.

The third recording head 4 mounts a plurality of valve-type inkjet nozzles, is movable in the horizontal direction and the vertical direction in a stage of being arranged so as to discharge the modeling material from the bottom to the top, and is relatively movable around the solid object. The platform 5 is used to mount a solid object, and is rotatable by using a motor as a motor not depicted. The housing 6 accommodates each of members.

The first drive mechanism 55 moves the first recording head 2 horizontally and vertically relative to the platform 5. The second drive mechanism 56 moves the second recording head 3 horizontally and vertically relative to the platform 5. The third drive mechanism 57 moves the third recording head 4 horizontally and vertically relative to the platform 5.

An upper surface portion 10A, on which the first drive mechanism 55, the second drive mechanism 56, and the third drive mechanism 57 are mounted, and a base portion 10B, on which the platform 5 is mounted, are accommodated in the housing 6.

Here, a valve-type inkjet nozzle 40, which is mounted on each of the first recording head 2, the second recording head 3, and the third recording head 4, is capable of discharging the modeling material pressurized by opening and closing a discharging port with a valve body, and a structure thereof will be described.

Figure 2A:
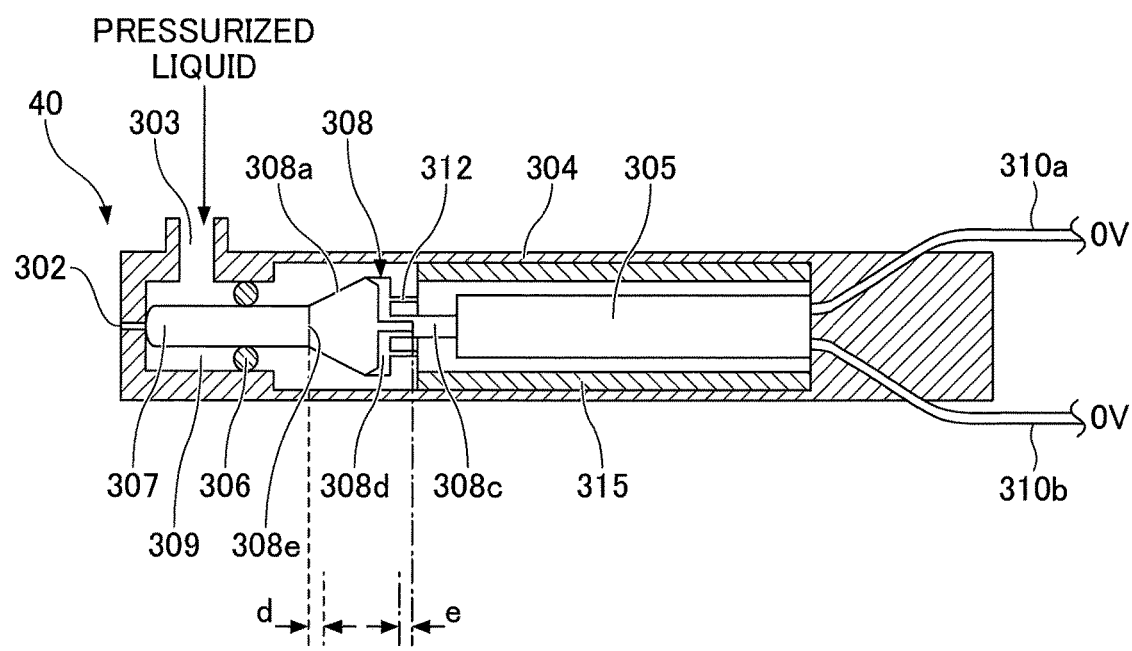
FIG. 2A is a sectional view illustrating an example of a valve-type inkjet nozzle illustrating an occlusive state of an outlet port.
Figure 2B:
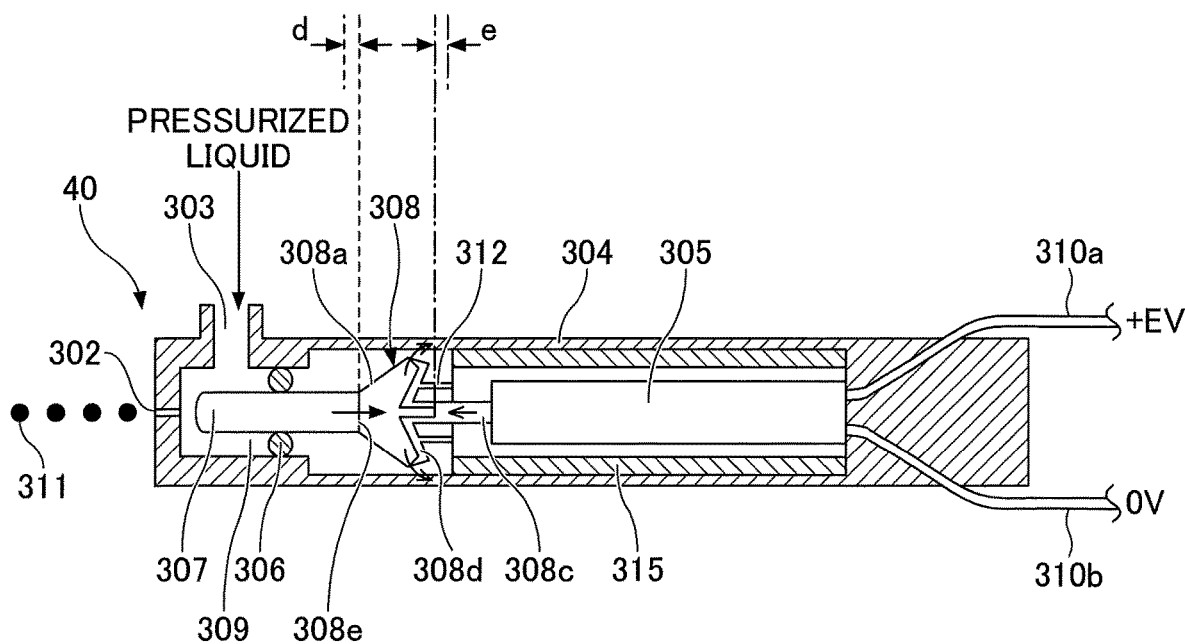
FIG. 2B is a sectional view illustrating an example of a valve-type inkjet nozzle illustrating an open state of the outlet port.

Next, an example of a valve-type inkjet nozzle will be described with reference to FIG. 2A and FIG. 2B. FIG. 2A and FIG. 2B are cross-sectional views for illustrating one of nozzle portions of a recording head. FIG. 2A illustrates a state which a nozzle is closed and FIG. 2B a state which a nozzle is opened.

The valve-type inkjet nozzle 40 includes a hollow housing 304 having a nozzle 302 at a distal end for discharging liquid and an inlet 303 for injecting liquid near the nozzle 302.

Inside the housing 304, a piezoelectric element 305, a valve body 307, and a valve body moving section 308 are disposed. The piezoelectric element 305 expands and compresses upon application of an external voltage. The valve body 307 opens and closes the nozzle 302. The valve body moving section 308 is disposed between the valve body 307 and the piezoelectric element 305, and moves the valve body 307 back to the nozzle 302.

The piezoelectric element 305 is accommodated in a case 315. A pair of wiring members 310a and 310b for voltage application are connected to the piezoelectric element 305 and pulled out from the valve-type inkjet nozzle 40.

A sealing member 306 is disposed between the valve body 307 and the housing 304 to prevent invasion of pressurized liquid, which is injected from the inlet 303, toward the piezoelectric element 305. This creates a liquid chamber 309, into which the pressurized liquid is injected from the inlet 303.

The housing 304 is a cylindrical body, which is a cylindrical shape, a rectangular shape, or the like, and is closed except for the nozzle 302 and the inlet 303. The nozzle 302 is an opening opened at the distal end of the housing 304 to discharge liquid 311. The inlet 303 is provided on a lateral of the housing 304 near the nozzle 302 to provide a continuous supply of the pressurized liquid.

The piezoelectric element 305 is formed of zirconia ceramics or the like. The piezoelectric element 305 is provided with a drive waveform (drive voltage) through the wiring members 310a and 310b.

The sealing member 306 is, for example, a gasket, an O-ring, or the like and is outer fitted to the valve body 307 to prevent liquid from flowing from the inlet 303 to the piezoelectric element 305.

The valve body moving section 308 has a deformation portion 308a, which is formed of a recoverable and deformable elastic member formed of rubber, and has a generally trapezoidal cross-sectional surface, soft resin, thin metal plate, or the like. A connection portion 308e corresponding to an upper side of the generally trapezoidal cross-sectional surface of the deformation portion 308a is secured to a proximal surface of the valve body 307. A long side corresponding to a bottom of the substantially trapezoidal cross sectional surface of the deformation portion 308a is connected to a bent edge portion 308d. A radial center portion of the bent edge portion 308d is connected to a guide portion 308c, and a portion from the radial center portion to one edge is connected to a fixing portion 312 coupled to the case 315.

By applying a predetermined voltage to the piezoelectric element 305 and stretching the piezoelectric element 305, the guide portion 308c moves, for example, by a distance e toward the nozzle 302 and is pushed near a center of the bent edge portion 308d.

Because an outer circumferential side of the guide portion 308c is connected to the fixing portion 312, the bent edge portion 308d displaces in a direction indicated by an arrow from a connection portion of the fixing portion 312 as a starting point. As the bent edge portion 308d is displaced in the direction indicated by the arrow, the deformation portion 308a expands and opens, so that the connection portion 308e with the valve body 307 is retracted in the direction indicated by the arrow.

The deformation portion 308a of the valve body moving section 308 is deformed, the valve body 307 fixed to the connection portion 308e of the deformation portion 308a is pulled by a distance d, and the nozzle 302 is opened.

That is, the extension of the piezoelectric element 305 causes the guide portion 308c to move by a distance e toward the nozzle 302, so that the valve body 307 moves by the distance d in a direction opposite to a movement direction of the guide portion 308c (extension direction of the piezoelectric element 305).

Here, by adjusting respective distances from the valve body 307 to the connection portion 308e and the bent edge portion 308d and adjusting a length of the bent edge portion 308d in the deformation portion 308a of the valve body moving section 308, an amount of a movement of the valve body 307 may be longer than the displacement of the piezoelectric element 305.

That is, it is possible for the valve body moving section 308 to amplify the displacement of the piezoelectric element 305 and to reduce the displacement of the piezoelectric element 305, thereby reducing the size of the piezoelectric element 305.

Each of the first recording head 2, the second recording head 3, and the third recording head 4 is formed by mounting a plurality of valve-type inkjet nozzles 40 described above. The first recording head 2 is disposed so that a discharge direction of the modeling material is downward on one end side of a rail 11A being horizontally disposed. The rail 11A is movably mounted to a rail 11B orthogonal to each other through a guide block (not depicted). Thus, the first recording head 2 is movable in the horizontal direction.

An opposite end of the rail 11B is movably mounted to a rail 11C extending in a vertical direction via a guide block not depicted, and the first drive mechanism 55 is disposed on an upper side of the rail 11C. The first recording head 2 is capable of moving in directions (X direction and Y direction) in the horizontal plane and a vertical direction (Z direction) by moving the rail 11A and the rail 11B horizontally relative to each other by power from a drive source 14 such as a motor and by moving the rail 11C vertically.

Also, the second recording head 3 is arranged so that the discharge direction of the modeling material becomes the horizontal direction (lateral direction) on one end side of a rail 12A being horizontally disposed, and the rail 12A is attached to a rail 12B being vertically erected to be horizontally movable, and the second driving mechanism 56 is disposed on the upper side of the rail 12B. The operation of the second drive mechanism 56 causes the rail 12B to move upward and downward, thereby causing the rail 12A and the second recording head 3 to move upward and downward. The rail 12A is then linearly moved horizontally by a drive source 15. In addition, the second recording head 3 may be configured to be movable in directions (X direction and Y direction) in the horizontal plane and the vertical direction (Z direction) in the same manner as the first recording head 2. Alternatively, the second recording head 3 may be arranged with an elevation angle or a depression angle relative to the horizontal (lateral) direction.

Furthermore, the third recording head 4 is mounted to a movement mechanism similar to the second recording head 3. That is, at one end side of the flat rail 13A, the discharge direction of the modeling material is disposed with a predetermined elevation angle so as to be obliquely upward, and the rail 13A is attached to the rail 13B being vertically arranged so as to be horizontally movable. The third drive mechanism 57 is disposed on the upper side of the rail 13B. The third drive mechanism 57 operates to move the rail 13B upward and downward, thereby raising and lowering the rail 13A and the third recording head 4. The rail 13A is then linearly moved in the horizontal direction by the drive source 16. In addition, the third recording head 4 may be configured so that it is possible to move in the directions (X direction and Y direction) in the horizontal plans and the vertical direction (Z direction) in the same manner as the first recording head 2. Also, the third recording head 4 may be mounted facing upward, that is, with a 90 degree orientation relative to a surface of the platform 5.

Figure 2C:
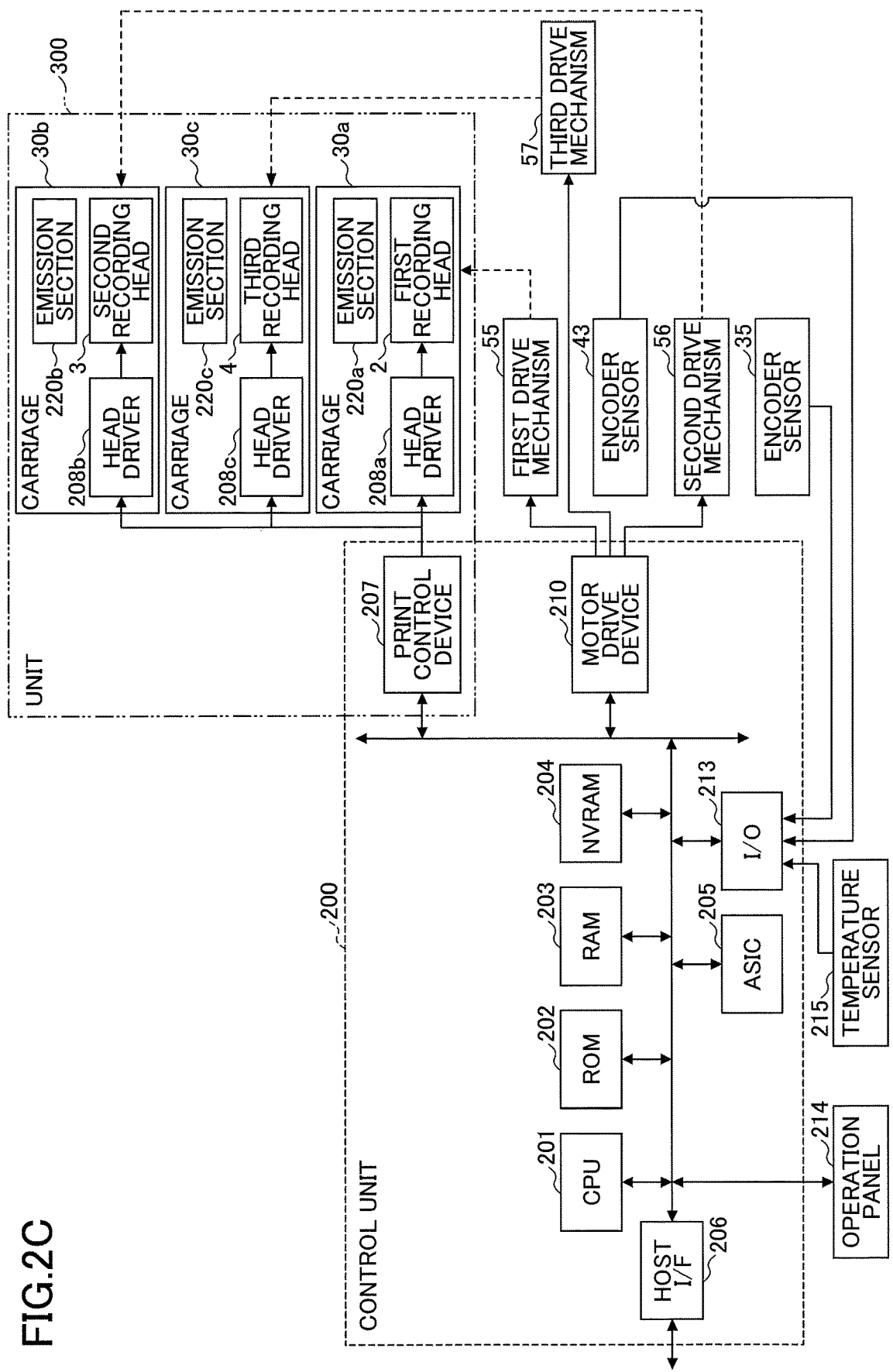
FIG. 2C is a block diagram illustrating a hardware configuration example of a three dimensional modeling apparatus according to the first embodiment.
Figure 3:
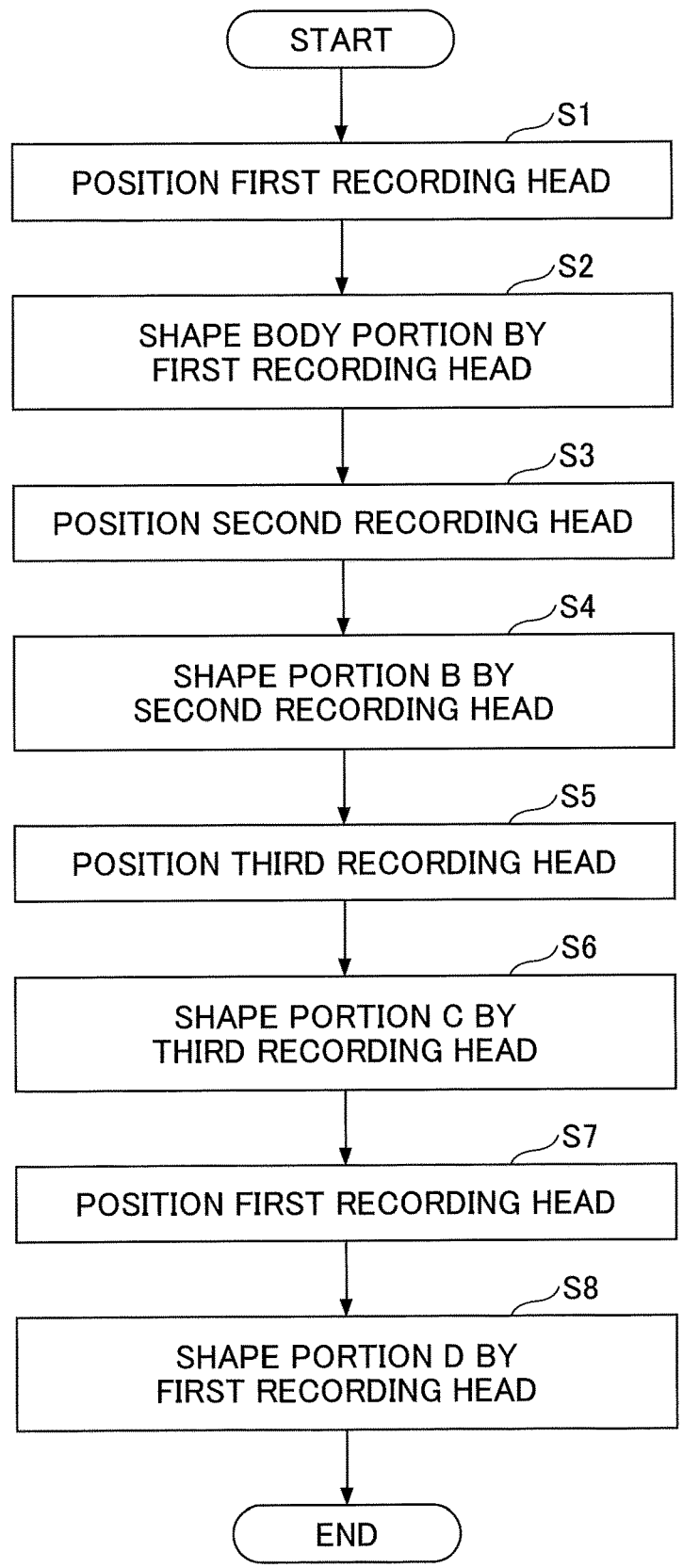
FIG. 3 is a flowchart illustrating an embodiment of a modeling process performed using the three dimensional modeling apparatus according to the first embodiment.

The first drive mechanism 55, the second drive mechanism 56, and the third drive mechanism 57 are controlled by a control unit 200 illustrated in FIG. 2C, and rotation of the platform 5 is also controlled by the control unit 200. The control unit 200 includes a computer operated by a program for conducting procedures depicted in FIG. 2C. In the first embodiment, in a configuration in which the second recording head 3 and the third recording head 4 move relatively to each other at an periphery of the solid object shaped on the platform 5, the platform 5 is rotated. Alternatively, the platform 5 may be fixed so that the second recording head 3 and the third recording head 4 rotate around the solid object being formed.

[Hardware Configuration of Three Dimensional Modeling Apparatuses]

Next, the hardware configuration of the three dimensional modeling apparatus 1 will be described. FIG. 2C is a block diagram illustrating an example of a hardware configuration of a three dimensional modeling apparatus 1. For example, the three dimensional modeling apparatus 1 may have a hardware configuration as illustrated in FIG. 2C.

The three dimensional modeling apparatus 1 includes a CPU (Central Processing Unit) 201, a ROM (Read Only Memory) 202, and a RAM (Random Access Memory) 203. The three dimensional modeling apparatus 1 also includes a NVRAM (non-volatile RAM, non-volatile RAM) 204 and an ASIC (Application Specified Circuit) 205.

Moreover, the three dimensional modeling apparatus 1 includes a host I/F 206, a print control device 207, carriages 30a, 30b, and 30c, a motor drive device 210, and an I/O (Input/Output) 213.

Furthermore, the three dimensional modeling apparatus 1 includes an operation panel 214, a temperature sensor 215, a first drive mechanism 55, an encoder sensor 43, a second drive mechanism 56, an encoder sensor 35, and a third drive mechanism 57.

The CPU 201 controls the entire three dimensional modeling apparatus 1. That is, the CPU 201 is an arithmetic processing unit that performs operations for realizing various processes and a data process performed by the control unit 200. The CPU 201 is a controller for controlling hardware depicted in FIG. 2C.

The ROM 202, the RAM 203, and the NVRAM 204 are examples of storage devices. Specifically, the ROM 202 stores data such as programs executed by the CPU 201 and fixed data. The RAM 203 also stores data such as image data. Furthermore, the NVRAM 204 retains data even when the power of the three dimensional modeling apparatus 1 is shut off. Thus, data or the like, which is retained even if the power of the three dimensional modeling apparatus 1 is shut off, are stored in the NVRAM 204.

The ASIC 205 is an electronic circuit for conducting various signal processes, an image process such as sorting, and input/output signal processes for controlling the entire three dimensional modeling apparatus 1.

The host I/F 206 is an interface that transmits and receives data with a host computer.

The print control device 207 transmits data for driving the first recording head 2, the second recording head 3, the third recording head 4, and the like. The print control device 207 also generates and transmits drive waveforms.

The carriage 30a is implemented by a head driver 208a, the first recording head 2, an emission section 220a, and the like. The head driver 208a is a driver IC (Integrated Circuit) or the like for driving the first recording head 2 provided on a side of the carriage 30a. The emission section 220a is a light source or the like that emits UV light for curing a UV curable resin.

The carriage 30b is implemented by a head driver 208b, the second recording head 3, an emission section 220b, and the like. The head driver 208b is a driver IC or the like for driving the second recording head 3 provided on the carriage 30b side. The emission section 220b is a light source or the like that emits the UV light for curing the UV curable resin.

The carriage 30c is implemented by a head driver 208c, the third recording head 4, an emission section 220c, and the like. The head driver 208c is a driver IC or the like for driving a third recording head 4 provided on the carriage 30c side. The emission section 220c is a light source or the like that emits the UV light for curing the UV curable resin.

Each of the above-described emission sections 220a to 220c is an example of a "curing section".

Here, a print control device 207 and the carriages 30a to 30c are combined to form a unit 300 for discharging droplets. The print control device 207 and the head drivers 208a to 208c are combined to form a unit control section of the unit 300 that discharges the droplets. The control of the unit 300 for discharging the droplets will be described later with reference to FIG. 4A and FIG. 4B.

The motor drive device 210 drives the first drive mechanism 55, the second drive mechanism 56, and the third drive mechanism 57.

The encoder sensor 43 outputs a detection signal indicating a position of the first drive mechanism 55. Similarly, the encoder sensor 35 outputs a detection signal indicating a position of the second drive mechanism 56. The temperature sensor 215 measures environmental temperature of the three dimensional modeling apparatus 1, and outputs a detection signal.

The I/O 213 is an interface for inputting a detection signal from each of the encoder sensors 35 and 43.

The operation panel 214 is a display device for displaying various information items for a user and also an input device for inputting an operation by the user of the three dimensional modeling apparatus 1.

For example, the control unit 200 receives image data and the like from an information processing device such as a Personal Computer (PC), an image reading device such as an image scanner, and an imaging device such as a digital camera by the host I/F 206. The image data and the like is received via a cable or a network. Next, the CPU 201 possessed by the control unit 200 reads out and analyzes the image data and the like stored in a receiving buffer of the host I/F 206.

The control unit 200 performs a process such as an image process and a data sorting by the ASIC 205. Subsequently, the image data processed by ASIC 205 is transmitted by the print control device 207 to the head drivers 208a to 208c.

Also, the print control device 207 uses the image data as serial data and transmits the image data to the head drivers 208a to 208c. Moreover, the print control device 207 transmits signals such as clock signals, latch signals, and droplet control signals (mask signals) used to transmit the image data to the head drivers 208a to 208c.

Furthermore, the print control device 207 includes a digital/analog (D/A) converter that converts data representing a driving signal pattern stored in the ROM 202 or the like into digital or analog data. The print control device 207 also includes a common drive waveform generator 301 that generates a drive signal by a voltage amplifier that amplifies the voltage of a signal and a current amplifier that amplifies a current of the signal.

Moreover, the print control device 207 has a selection unit (not depicted) that directs the selection of a drive waveform transmitted to the head drivers 208a to 208c. Subsequently, one or more driving waveform pulses, that is, drive signals (common driving waveforms) are transmitted to the head drivers 208a to 208c. Details of the print control device 207 will be described later.

The head drivers 208a to 208c transmit image data serially. In addition, the image data are transmitted to the head drivers 208a to 208c with data corresponding to one line for each of the first recording head 2, the second recording head 3, and the third recording head 4. Based on this one line of data, the head drivers 208a to 208c apply a driving signal that is a driving waveform to each (individual electrode) of the first recording head 2, the second recording head 3, and the third recording head 4. When the drive signal is applied, the drive elements (for example, piezoelectric members or the like including piezoelectric elements 305) included in each of the first recording head 2, the second recording head 3, and the third recording head 4 generate energy for discharging droplets. In this manner, based on the image data, each of the first recording head 2, the second recording head 3, and the third recording head 4 is driven.

In addition, it is possible for the three dimensional modeling apparatus 1 to selectively jet droplets with a different size such as large droplets (large dots), medium droplets (medium dots), and small droplets (small dots).

Moreover, the CPU 201 samples a detection signal transmitted from the encoder sensor 43 forming a linear encoder or the like to obtain a speed detection value, a position detection value, or the like. Next, the CPU 201 calculates a driving output value, that is, a control value for controlling the first drive mechanism 55 based on a target speed value and a target position, which are obtained from a speed and a position profile stored in advance, and a speed detection value and a position detection value. Next, the CPU 201 drives the first drive mechanism 55 through the motor drive device 210 based on the control value.

Similarly, the CPU 201 samples the detected signal transmitted from the encoder sensor 35 forming a rotary encoder or the like to obtain the speed detection value, the position detection value, and the like. Next, the CPU 201 calculates the driving output value, that is, the control value for controlling the second driving mechanism 56 on the basis of the target speed value and the target position, which are obtained from the speed, the position profile, and the like stored in advance, and the speed detection value and the position detection value. Subsequently, the CPU 201 drives the second drive mechanism 56 through the motor drive device 210 based on the control value.

Figure 4A:
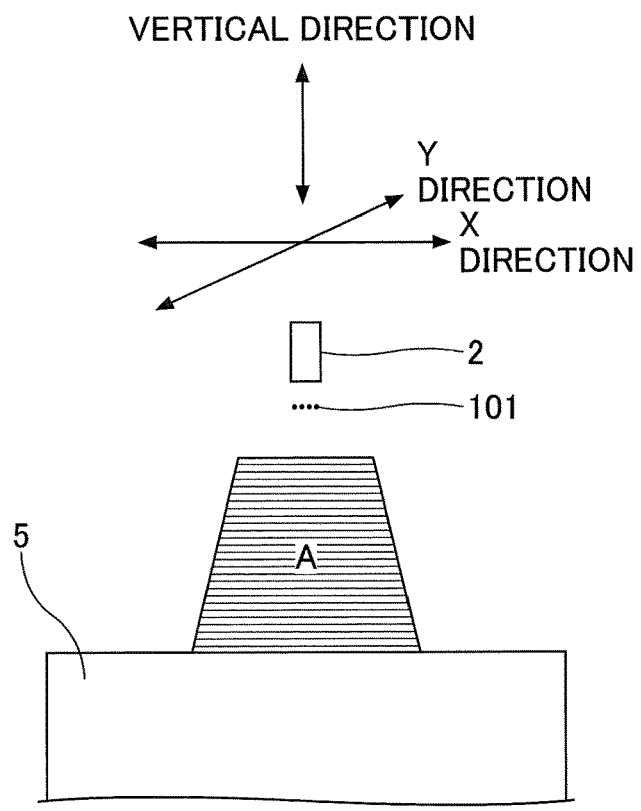
FIG. 4A is a diagram illustrating an initial state of a modeling by a first recording head.
Figure 4B:
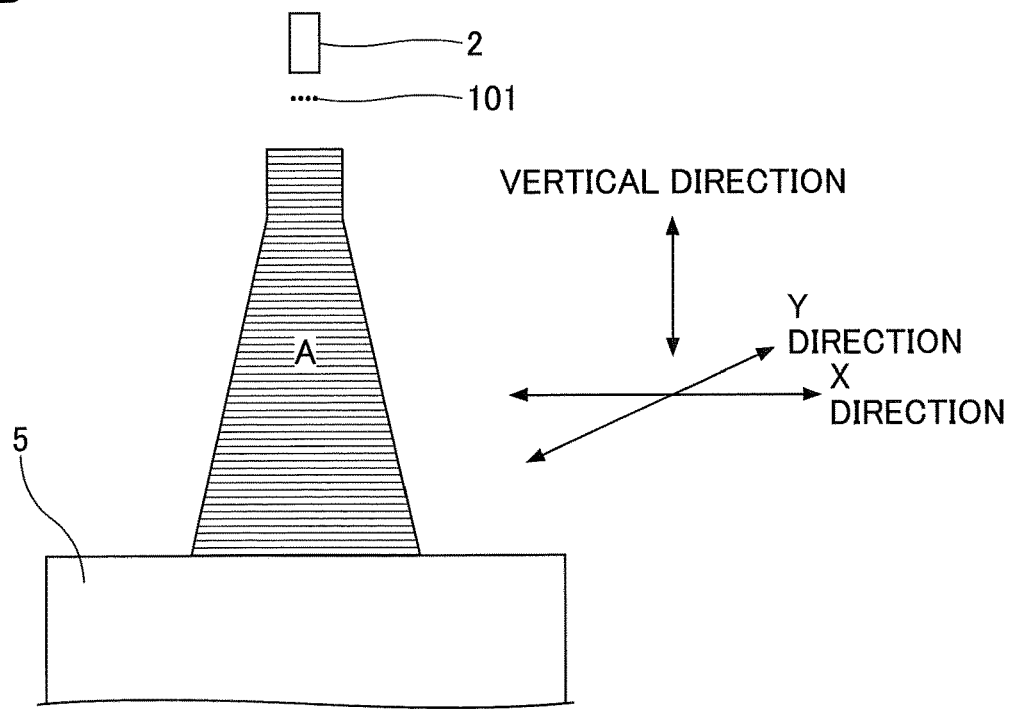
FIG. 4B is a diagram illustrating a state in which the modeling progresses further from the initial state in FIG. 4A.

Next, a configuration procedure using the three dimensional modeling apparatus 1 according to the first embodiment will be described. First, the first recording head 2 is positioned in a predetermined position above the platform 5 (step S1). Next, as depicted in FIG. 4A, while rotating the platform 5 at a given speed, the first recording head 2 successively discharges dots 101 such as the modeling material, that is, the UV curable resin onto a designated area by scanning in the X and Y directions, and further emits UV light to cure a UV curable resin layer. Moreover, a predetermined thickness of the UV curable resin layer is formed thereon, and this layer is appropriately repeated to form a portion A (body portion) as depicted in FIG. 4B (step S2).

Figure 5A:
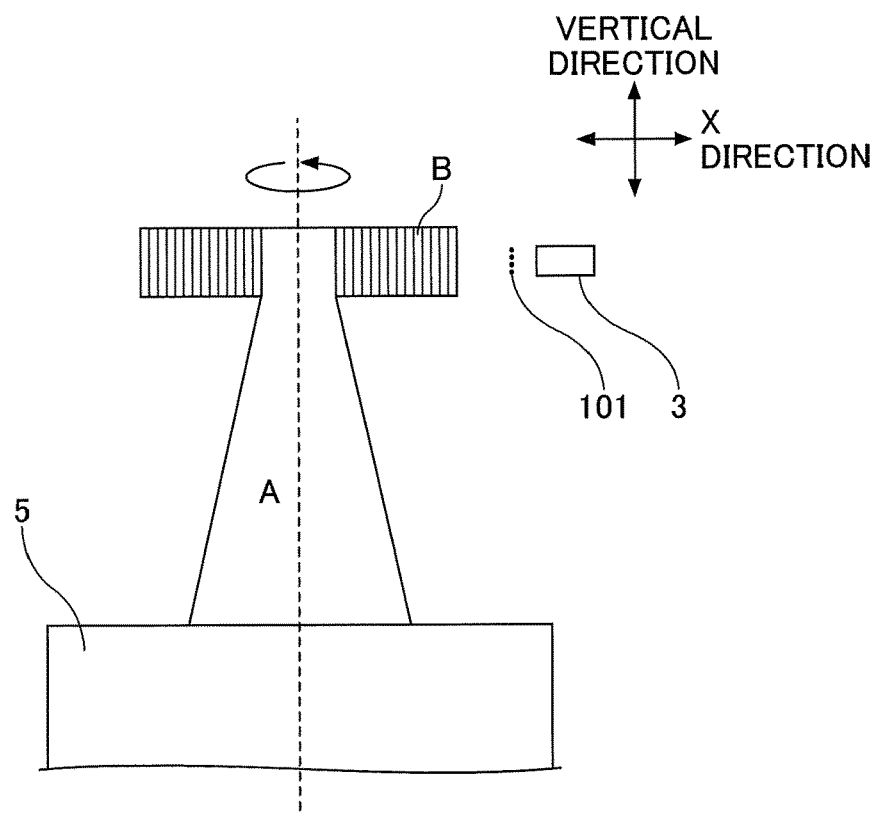
FIG. 5A is a diagram illustrating an initial state of a modeling by a second recording head.

Next, the second recording head 3 is positioned at a predetermined position beside an upper end of the portion A (step S3). Then, while rotating the platform 5 at the given speed, the second recording head 3 successively discharges the dots 101 such as the UV curable resin in the horizontal direction (transverse direction), and the UV curable resin layer is cured by ultraviolet radiation. By appropriately repeating this process, as depicted in FIG. 5A, the portion B is successively laminated laterally, and the dots 101 are ultimately shaped to be in a state of FIG. 5B (step S4).

Figure 6A:
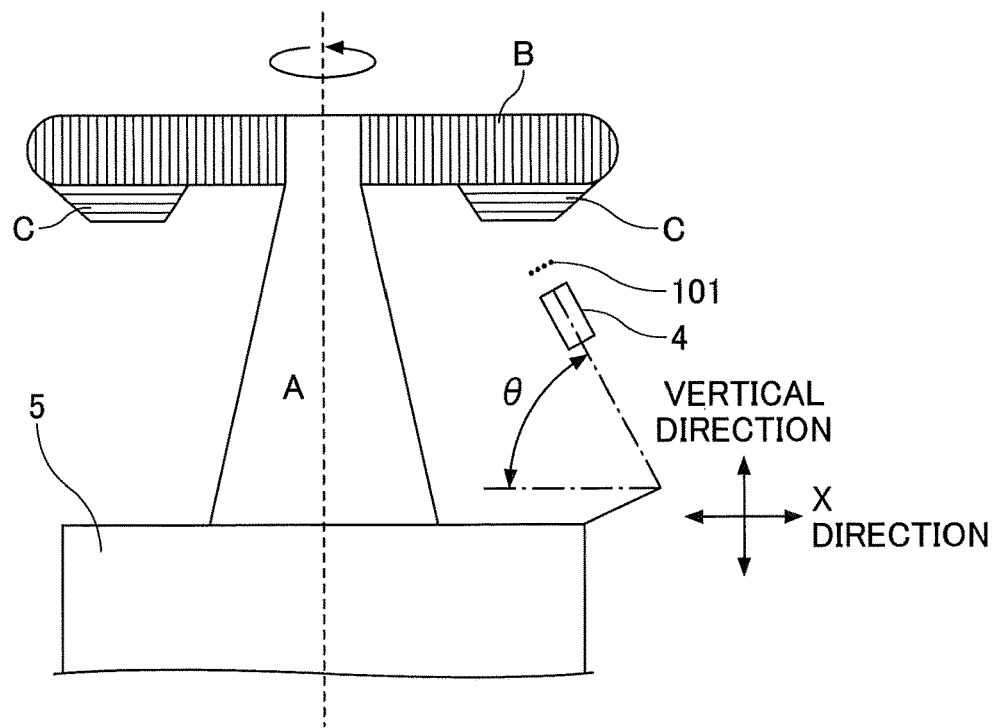
FIG. 6A is a diagram illustrating an initial state of a shape by a third recording head.
Figure 6B:
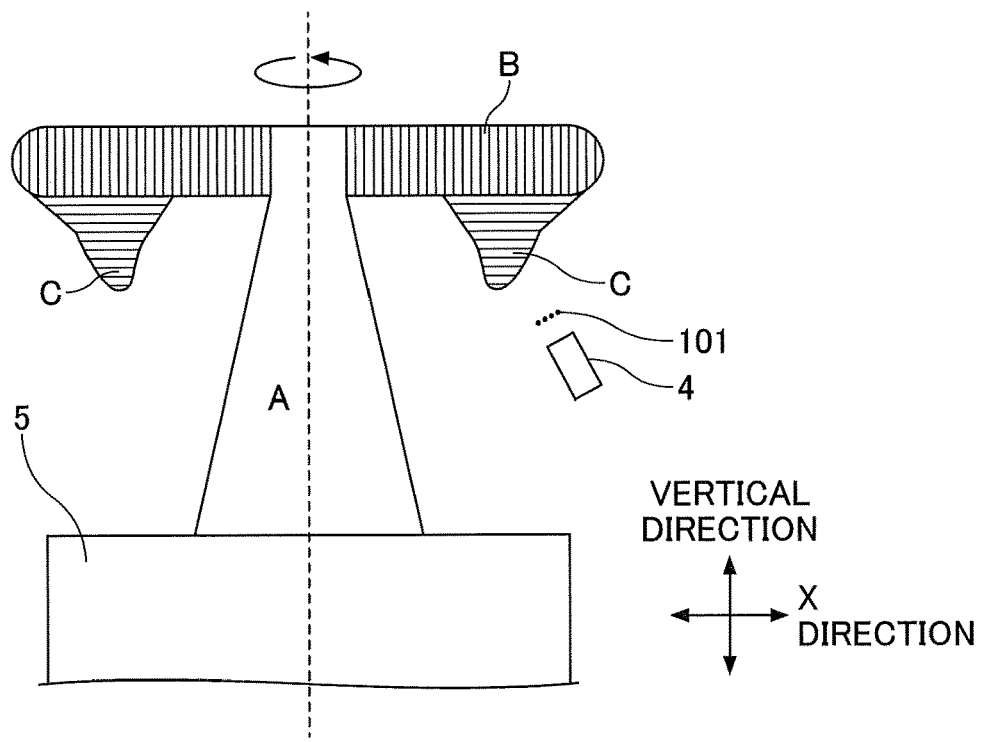
FIG. 6B is a diagram illustrating a state in which the shape is further advanced from the initial state in FIG. 6A.

Next, the third recording head 4 is positioned in a certain position on a lower side of a periphery of the portion B (step S5). The third recording head 4 is positioned with an elevation angle of an angle θ (see FIG. 6A) in the discharge direction. While rotating the platform 5, the dots 101 made of the UV-curable resin are successively discharged from the nozzle of the third recording head 4, and the C portion is sequentially laminated in the lower direction as depicted in FIG. 6(A), and finally, the portion C is formed on a lower side of the portion B as depicted in FIG. 6B (step S6).

Figure 7:
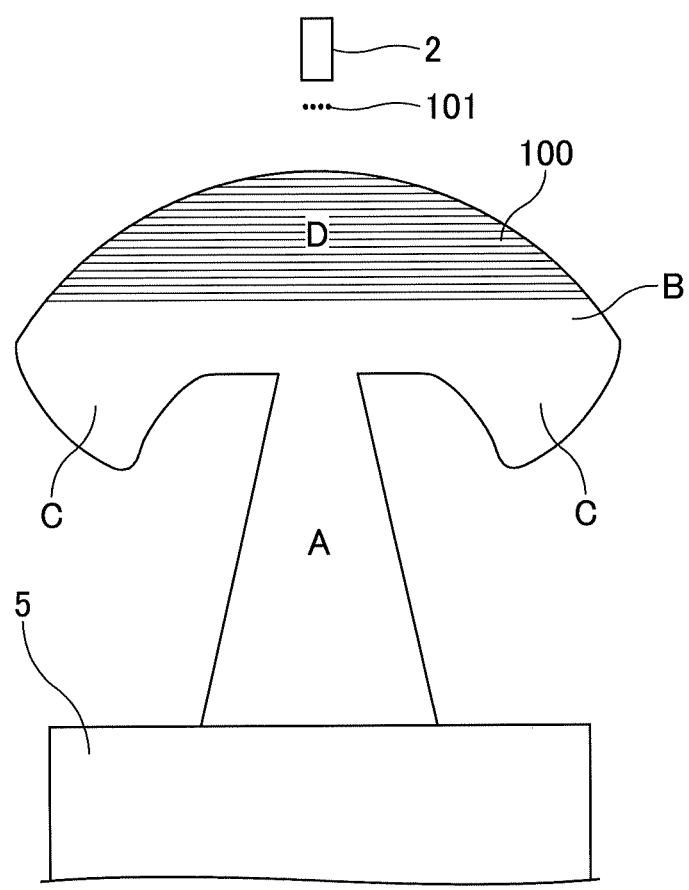
FIG. 7 is a diagram illustrating the modeling of a top (portion D) of the first recording head.

Next, the first recording head 2 is positioned in a certain position above the portion B (step S7). As depicted in FIG. 7, in step S8, a portion D is formed in a state in which the first recording head 2 is moved horizontally by rotation of the platform 5. Thus, a so-called "mushroom-shaped" solid object 100 is formed on the platform 5. By the above described structure enabling the third recording head 4 to discharge the droplets (dots 101) obliquely upward, it is possible to reduce interference due to already formed portions.

Although the modeling material is the UV curable resin, another material such as a thermoset resin or the like may be used. If the thermoset resin is used as the modeling material, it is possible to form by curing the thermoset resin with a laser, an electron beam, or a heat emission. Alternatively, as the modeling material, it is possible to produce a metal solid object by discharging as a dot a material made by dissolving metal particles in a high viscosity solvent as well as the resin.

Effect of First Embodiment

According to the first embodiment, the three dimensional modeling apparatus includes the first recording head 2 movable horizontally and vertically with respect to the platform 5 in a state of being arranged to discharge the modeling material downward, the second recording head 3 movable horizontally and vertically with respect to the platform 5 in a state being arranged to discharge the modeling material horizontally and vertically with respect to the platform 5, and the third recording head 4 movable horizontally and vertically with respect to the platform 5 in a state of being arranged to discharge the modeling material upward. Because a plurality of valve-type inkjet nozzles 40, which controls the discharge of the modeling material pressurized by opening and closing the discharging port by the valve body, are mounted to each of the first recording head 2, the second recording head 3, and the third recording head 4, the modeling materials are directed downward, transversely, and upward. By this configuration, advantageously, it is possible to form the solid object 100 having a shape, for example, a "mushroom-shaped" solid object 100, which has not been formed by a three dimensional modeling apparatus using a conventional inkjet nozzle. More specifically, for example, a part extending from the body, such as an umbrella portion of a "mushroom-shaped" umbrella, can be easily formed.

The inkjet nozzle mounted on the conventional recording head has an ink outlet always open. If high pressure is applied to an ink chamber, an ink leaks from a tip of the inkjet nozzle. Thus, a high viscosity ink could not be discharged. Accordingly, when the conventional recording head is used in a three dimensional modeling apparatus, it is impossible to discharge the modeling material as dots in a transverse direction or an upward direction of the high viscosity modeling material, and it is only possible to discharge the modeling material (the dots) from the top to the bottom. In this regard, the inventors have developed for many years a valve-type inkjet nozzle capable of directly ejecting high viscosity ink long distances (for example, Japanese Patent Application No. 2018-4682). The valve-type inkjet nozzle is capable of applying a high pressure of several atmospheres or more to an ink chamber to allow straight discharge of high viscosity material dots of 100 mPa·s or more for 10 cm or more. It is possible to eject in a lateral direction from a side to another side as well as the vertical direction from the top to the bottom.

2. Second Embodiment

Configuration of Second Embodiment of Three Dimensional Modeling Apparatus

Figure 8:
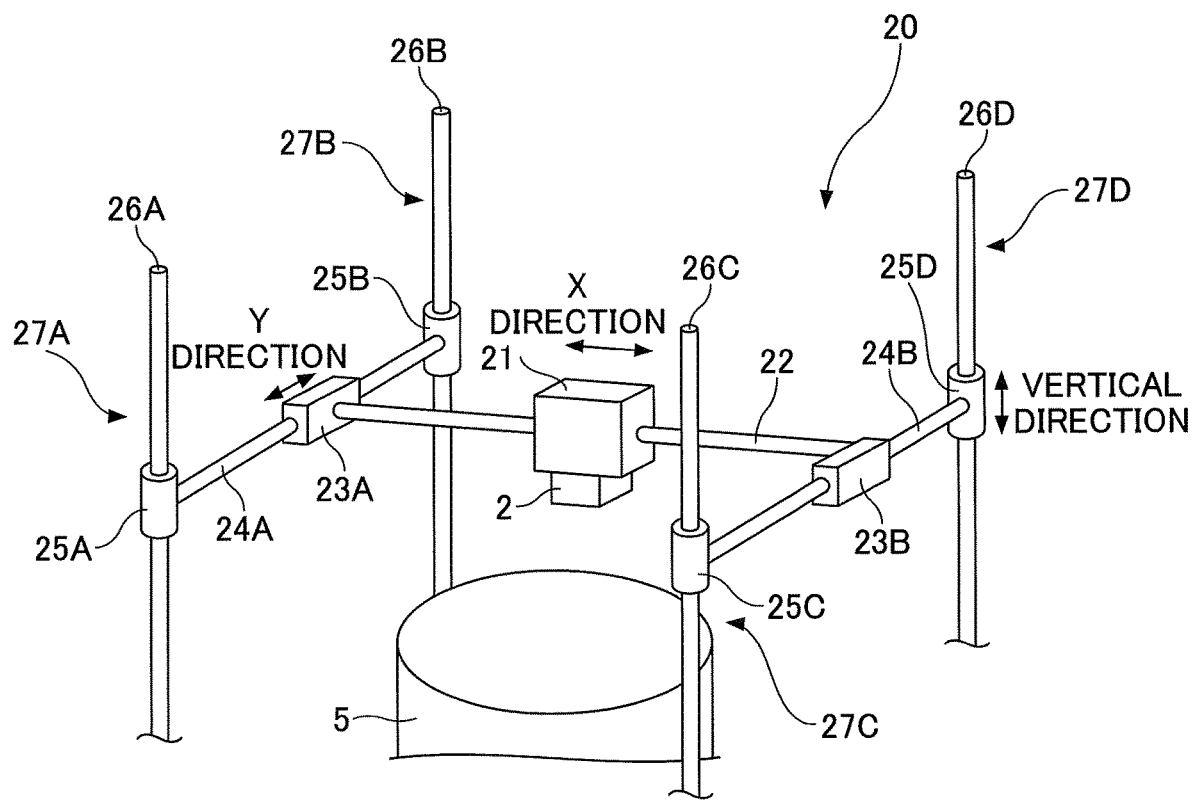
FIG. 8 is a perspective view illustrating a drive system of a first recording head in a three dimensional modeling apparatus according to a second embodiment.
Figure 9A:
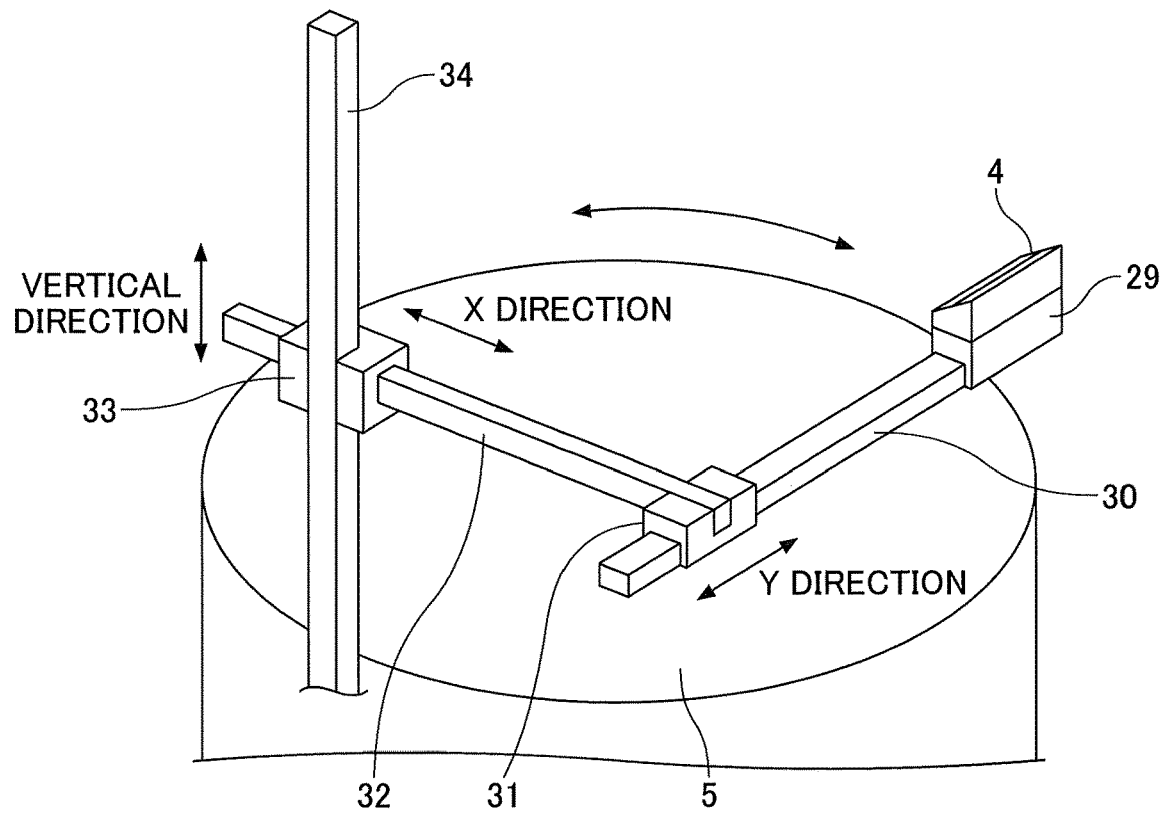
FIG. 9A is a perspective view illustrating a drive system of a third recording head of the three dimensional modeling apparatus according to the second embodiment.
Figure 9B:
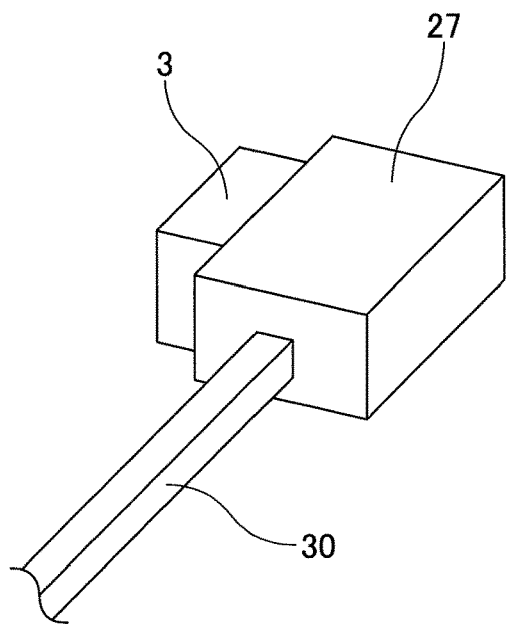
FIG. 9B is a perspective view illustrating an arrangement of a second recording head.
Figure 10A:
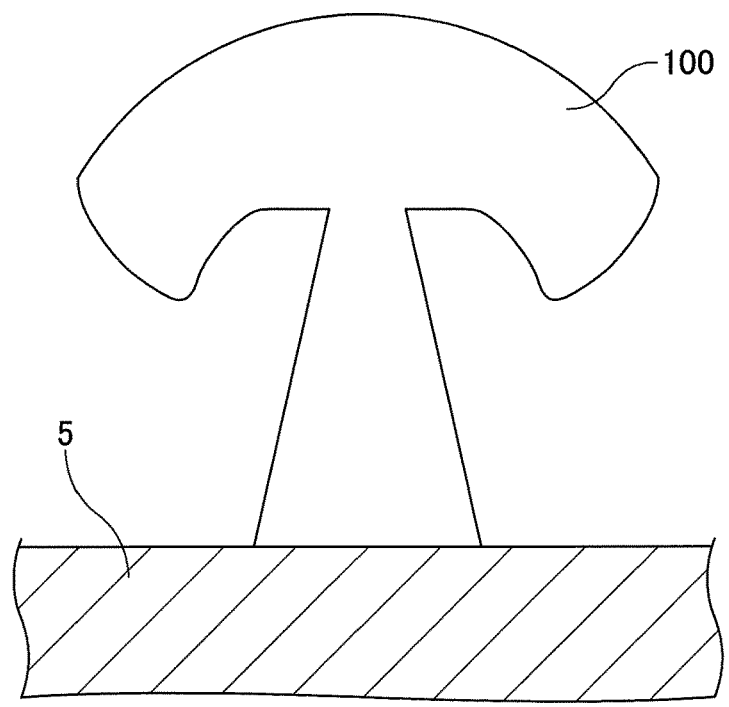
FIG. 10A is a sectional view illustrating an operation of a recording head of a conventional three dimensional modeling apparatus according to the second embodiment, taking a shape of a solid object of a "mushroom shape" an example to be modeled.
Figure 10B:
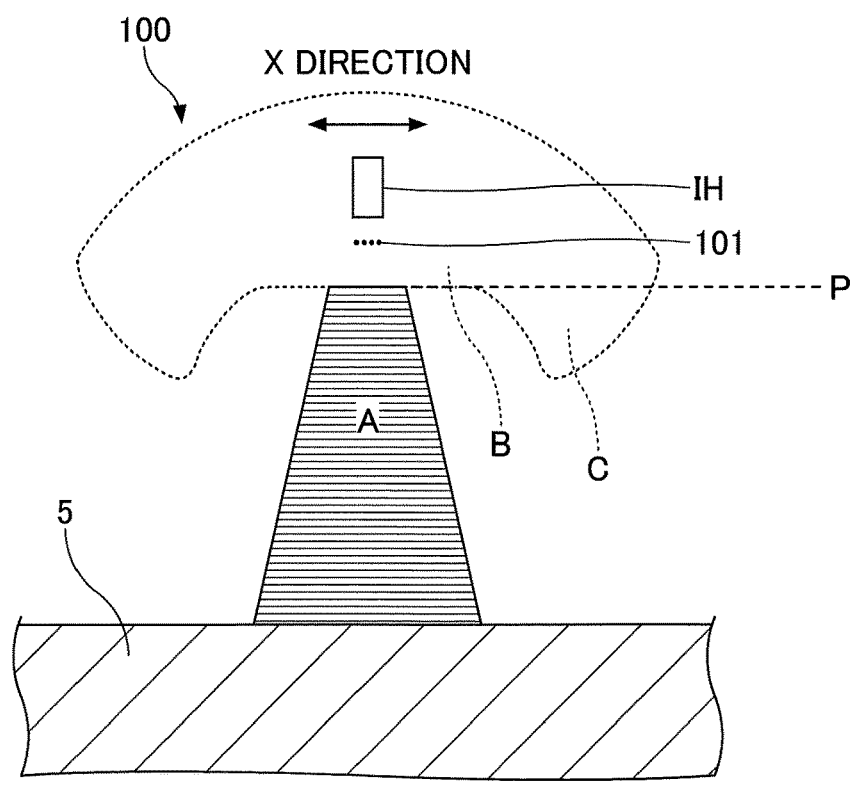
FIG. 10B is a diagram illustrating the operation of a conventional three dimensional modeling apparatus.

Next, a configuration of a second embodiment of a three dimensional modeling apparatus according to the present invention will be described. FIG. 8 is a perspective view illustrating a driving system of a first recording head in a three dimensional modeling apparatus according to the second embodiment, FIG. 9A is a perspective view illustrating a driving system of a third recording head of the three dimensional modeling apparatus according to the second embodiment, and FIG. 9B is a perspective view illustrating an arrangement of a second recording head. Components similar to those of the three dimensional modeling apparatus 1 of the first embodiment are given with the same reference numbers, and the detailed explanations thereof will be omitted.

As depicted in FIG. 8, the three dimensional modeling apparatus 20 in the second embodiment includes a head drive section 21 to which the first recording head 2 is mounted, a rail 22 for the first recording head 2 to be movable in a horizontal direction (X direction), drive sections 23A and 23B mounted on both ends of the rail 22, which moves the first recording head 2 in another horizontal direction (Y direction) perpendicular to the rail 22, rails 24A and 24B for respectively guiding the drive sections 23A and 23B in the horizontal direction (Y direction), ball splines 27A, 27B, 27C, and 27D for guiding the rails 24A and 24B up and down, and a platform 5 located at a center surrounded with the ball splines 27A, 27B, 27C, and 27D. The ball splines 27A, 27B, 27C, and 27D respectively include outer cylinder bodies 25A, 25B, 25C, and 25D, on which ends of the rails 24A, 24B are mounted, and spline shafts 26A, 26B, 26C, and 26D, on which the outer cylinder bodies 25A, 25B, 25C, and 25D are guided.

In FIG. 8, the first recording head 2 is moved in the X direction along the rail 22 by the head drive section 21. The first recording head 2 is guided to the rails 24A and 24B by the drive sections 23A and 23B to move in the Y direction perpendicular to the rail 22. That is, the first recording head 2 is movable on a plane, so-called a XY table, formed by rails 22, 24A, and 24B, the head drive section 21, and the drive sections 23A and 23B. Further, by simultaneously raising and lowering the outer cylinder bodies 25A to 25D along the spline shafts 26A to 26D by a control unit (not depicted), the first recording head is movable in the vertical direction, that is, in the Z direction.

Next, a drive system of the third recording head 4 will be described. The third recording head 4 is formed, that is attached at a tip side of the rail 32 movably supported at one side of a cross guide 33 and is mounted further via a guide block 31 at a tip of a rail 30. The rail 32 is arranged horizontally and the rail 34 is arranged vertically perpendicular to the rail 32. By a motor (not depicted) as a driving source, the rails 32 and 34 are movable in the vertical direction (Z-direction) and the horizontal direction (X-direction) in FIG. 9A, respectively. Moreover, the rail 30 is movable in the direction (Y-direction) perpendicular to the rails 32 by the guide block 31. As depicted in FIG. 9A, a discharge surface of the third recording head 4 is inclined and mounted to the rail 30 through a support member 29 to discharge the modeling material diagonally upward. Note that the third recording head 4 may be disposed so that the modeling material is discharged directly upward rather than diagonally upward.

A movement mechanism of the second recording head 3 is the same as that of the third recording head 4, and the description thereof will be omitted. However, the second recording head 3 differs from the third recording head 4 in that the second recording head 3 is mounted to the support member 27 so that the discharge surface faces in the horizontal direction (lateral direction) (see FIG. 9B). In addition, the first recording head 2 and the second recording head 3 may be mounted on the rail 30 that forms the movement mechanism of the third recording head 4 described above.

Figure 5B:
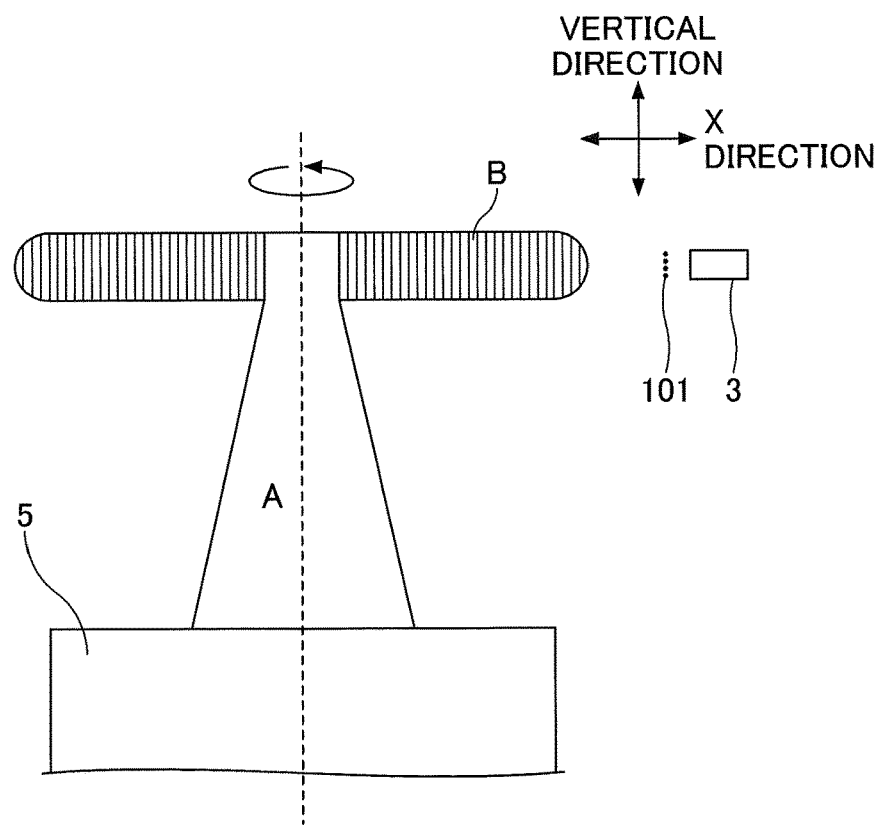
FIG. 5B is a diagram illustrating a state in which the modeling progresses further from the initial state in FIG. 5A.

In the three dimensional modeling apparatus 20 configured in this manner, first, the portion A is shaped by repeating processes of rotating the platform 5, discharging the molding modeling material from the first recording head 2 toward the platform 5 as the dots 101, and curing the modeling material by ultraviolet light to stack a solid object formed by the dots 101 (refer to FIG. 4A and FIG. 4B). Then, the portion B is shaped with respect to the portion A by discharging the dots 101 from the second recording head 3 in the horizontal direction (lateral direction) (FIG. 5A and FIG. 5B). Thereafter, the portion C is shaped by discharging the dots 101 from the third recording head 4 upward (refer to FIG. 6A and FIG. 6B. Finally, the portion D is formed by discharging the dots 101 from the first recording head 2 downward (refer to FIG. 7). By this configuration, it is possible for the three dimensional modeling apparatus 20 to shape the "mushroom-shaped" solid object 100.

Effect of Second Embodiment

According to the three dimensional modeling apparatus 20 according to the second embodiment, because the first recording head 2 is movable by the so-called XY table, it is possible to form a moving mechanism accurately and inexpensively. Also, because the second recording head 3 and the third recording head 4 are supported by the cross guides and the platform 5 is rotatable in a horizontal direction, the second recording head 3 and the third recording head 4 are relatively moved around a solid object, it is possible to easily form the configuration of the moving mechanism. Specifically, it is possible to easily form respective movement mechanisms of the second recording head 3 and the third recording head 4.

The present invention is not limited to the above-described embodiments, and various modifications may be made without departing from or modifying the technical ideas of the present invention. Lamination layers are formed by discharging the dots 101 from the recording heads 2, 3, and 4 while the platform 5 is rotated. Conversely, the platform 5 may be fixed so that the second recording head 3 and the third recording head 4 are rotated along the periphery of the solid object 100 by some means.

In the above described embodiments, each of the three dimensional modeling apparatuses 1 and 20 includes both the second recording head 3 and the third recording head 4, the three dimensional modeling apparatus 1 or 20 may include at least one of the second recording head 3 or the third recording head 4.

As described above, in the three dimensional modeling apparatus according to the present invention, advantageously, it is possible to form a solid object that has not been shaped by a three dimensional modeling apparatus using a conventional recording head.

Moreover, the present invention is not limited to the configurations in the above described embodiments described above, including combinations with other elements. In this viewpoint, variations and modifications may be made without departing from the scope of the invention, and may be properly defined depending on its application aspect. Furthermore, each of the above described recording heads may include an inkjet nozzle alone.

What is claimed is:

1. A three-dimensional modeling apparatus, comprising:
a plurality of inkjet nozzles, each inkjet nozzle configured to discharge a modeling material;
a plurality of recording heads, each recording head of the plurality of recording heads including a corresponding inkjet nozzle from among the plurality of inject nozzles; and
a light source configured to emit light that cures the discharged modeling material, wherein
the plurality of recording heads includes
a first recording head that discharges the modeling material downward; and
at least one of a second recording head that discharges the modeling material in a horizontal direction or a third recording head that discharges the modeling material upward,
each inkjet nozzle opens and closes a discharging port with a valve body to discharge the modeling material, the valve body having a first end disposed at the discharging port and a second end that is secured to a valve body moving section,
the valve body moving section includes a deformation portion formed of an elastic material,
the deformation portion of the valve body moving section is connected to a bent edge portion provided on an opposite side of the deformation portion from the inkjet nozzle, a radial center portion of the bent-edge portion is connected to a piezoelectric element via a guide portion, the piezoelectric element being accommodated in a case,
a portion of the bent-edge portion between the radial center portion and an outer peripheral edge of the bent-edge portion is coupled to the case accommodating the piezoelectric element via a fixing portion, and
displacement of the piezoelectric element towards the discharging port causes the deformation portion to expand and open.

2. The three-dimensional modeling apparatus as claimed in claim 1 further comprising
a platform configured to support a solid object placed on the platform and to rotate horizontally, the solid object being formed of the discharged modeling material, wherein
the second recording head and the third recording head move relative to a periphery of the solid object by allowing the platform to rotate horizontally.

3. The three-dimensional modeling apparatus as claimed in claim 1, wherein
each of the first to third recording heads is a valve-type inkjet nozzle that controls the discharge of the modeling material pressurized by opening and closing the discharging port with the valve body.

4. The three-dimensional modeling apparatus as claimed in claim 1, wherein the expansion and opening of the deformation portion causes the valve body to retract by a distance longer than the displacement of the piezoelectric element.

5. A liquid discharging apparatus configured to discharge a liquid onto a three-dimensional body, the liquid discharging apparatus comprising:

a plurality of recording heads, each recording head of the plurality of recording heads including a nozzle, with each nozzle being configured to discharge the liquid; and a plurality of driving mechanisms, each driving mechanism being included with a corresponding recording head of the plurality of recording heads, wherein each nozzle opens and closes a discharging port with a valve body to discharge the liquid, the valve body having a first end disposed at the discharging port and a second end that is secured to a valve body moving section, the valve body moving section includes a deformation portion formed of an elastic material, the deformation portion of the valve body moving section is connected to a bent edge portion provided on an opposite side of the deformation portion from the nozzle, a radial center portion of the bent-edge portion is connected to a piezoelectric element via a guide portion, the piezoelectric element being accommodated in a case, a portion of the bent-edge portion between the radial center portion and an outer peripheral edge of the bent-edge portion is coupled to the case accommodating the piezoelectric element via a fixing portion, and displacement of the piezoelectric element towards the discharging port causes the deformation portion to expand and open.

6. The liquid discharging apparatus as claimed in claim 5 further comprising a platform configured to support the three-dimensional body on the platform and to rotate horizontally, the three-dimensional body being formed of the discharged liquid, wherein the plurality of recording heads move relative to a periphery of the three-dimensional body by allowing the platform to rotate horizontally.

7. The liquid discharging apparatus as claimed in claim 5, wherein each recording head of the plurality of recording heads is a valve-type nozzle that controls the discharge of the liquid, the liquid being pressurized by opening and closing the discharging port with the valve body.

* * * * *